UNITED STATES PATENT OFFICE.

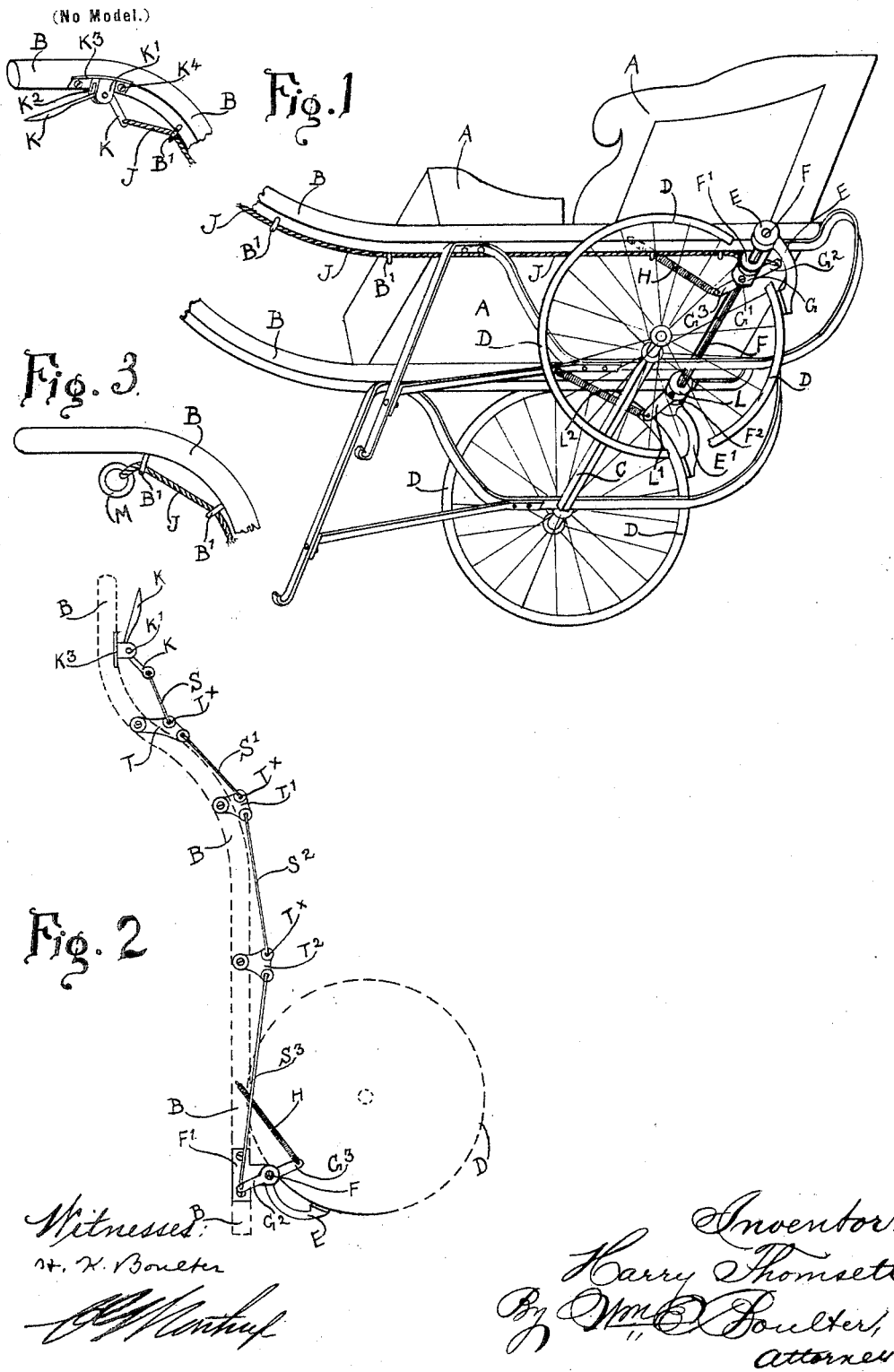

HARRY THOMSETT, OF LEICESTER, ENGLAND.

BRAKE FOR CHILDREN'S CARRIAGES.

SPECIFICATION forming part of Letters Patent No. 642,019, dated January 23, 1900.

Application filed July 8, 1899. Serial No. 723,173. (No model.)

*To all whom it may concern:*

Be it known that I, HARRY THOMSETT, a subject of the Queen of Great Britain, residing at Leicester, England, have invented certain new and useful Improvements in Brakes for Children's Carriages, (for which Letters Patent have been applied for in Great Britain, No. 25,145, dated November 29, 1898,) of which the following is a specification.

This invention relates to brakes for vehicles for carrying infants and small children, and has for its object to construct the brake in such a manner that the wheels are normally and automatically locked or braked against movement, so that such vehicles are not liable to the accidents which frequently occur when the said vehicles are left temporarily unattended.

The invention consists in the combination, with the wheels, of a brake automatically applied thereto and held in contact therewith and means between the said brake and the handles of the vehicle which can be grasped when taking hold of the handle to remove the brake off the wheels and permit the latter to revolve.

The invention will be understood from the following further description in reference to the accompanying drawings, in which—

Figure 1 is a perspective view of a child's mail-cart provided with automatically-applied brake mechanism constructed and operating according to this invention. Fig. 2 shows a modification in side elevation. Fig. 3 is a detail of the handle of the cart, flexible cord, and ring for pulling the latter taut to take off the brake.

Referring to the drawings, A represents the body of a child's mail-cart, B the two handles or shafts by which it is pushed or drawn and which extend underneath the body its full length, C the axle, and D the rubber-tired wheels, one on each end of the latter, all of which may be of any of the well-known forms of construction.

E E' are two brake-arms mounted one on each end of a rotatable rod or rock-shaft F, supported in eyes or bearings F' F², attached to the shafts or body of the cart. The rock-shaft has fixed thereon by a set-screw G' a collar G, from which project in opposite directions two arms G² G³, to one of which is attached a spring H, the other end of which is fastened to the shaft B, while the other arm G² has connected thereto a flexible cord or chain J, which passes through eyes or over runners B', fixed at intervals under the shaft, and the opposite or other end of the said cord or chain is attached to one end of a lever K, fulcrumed between two lugs K' K², formed integrally with a base-plate K³, fixed by screws K⁴ to the under side of the shaft B. The said lever K extends under the end portion of the handle, which is grasped by the attendant when wheeling the cart, so that, as hereinafter described, it can be grasped at the same time to take off the brake. The spring H is arranged so that it is normally pulling the arm G³ toward it, the effect of which is to partially rotate the rock-shaft F, so that the brake-arms E E' are pulled against the wheels D, so that the latter have the brake continually applied thereto until it is intentionally taken off by the attendant or user of the cart. This is effected by grasping the lever K at the same time as the handle B, thus drawing the lever close up against the handle, so that its opposite end pulls and tightens the cord or chain J, which in its turn draws the arm G² toward it, so that the latter partly rotates the rock-shaft F against the action of the spring H, and thereby removes the brake-arms E E' from the wheels. Immediately the lever K is released the spring H draws the brake-arms toward and forcibly holds them against the tires of the wheels. A second collar L, fast on the rock-shaft F and provided with an arm L', to which a spring L² is attached, the other end of the latter being connected to the shaft B, may, if desired, be employed to further assist in keeping the brake on the wheels, and the flexible cord J and lever K may also be duplicated on the other handle, if necessary.

Instead of the lever K, I may employ a ring M, Fig. 3, at the end of the flexible cord or chain, so that the finger of the attendant may be passed through the same when grasping the handle of the mail-cart and draw the cord or chain taut, so as to remove the brake, as hereinbefore described.

In Fig. 2 the brake mechanism is the same as herein described and illustrated with reference to Fig. 1, except that instead of a flexible cord wire-rod connections and intermediate pivoted arms are used. Between the arm G² and the lever K wire-rod connections S S' S² are employed, and these rods are hooked into or otherwise fastened to eyes T× in the lower ends of arms or plates T T' T², movably pivoted at their upper ends to the handle B. (Shown only in dotted line.) Upon the lever K being grasped and drawn up against the handle B, as hereinbefore described, it pulls the wire rod S. The latter draws the swing-plate T toward it, so that it turns on its pivot, and acting through the other wire rods S' S² S³ the other plates T' T² are similarly actuated to draw the arm G² in the same direction, so that the rock-shaft F is partly rotated and the brake-arms E taken off the wheels. Upon the lever K being released the spring H again applies the brake and restores the other parts to their original positions, as will be understood.

Having now particularly described and ascertained the nature of my said invention and in what manner the same is to be performed, I declare that what I claim is—

1. In a vehicle, the combination with the body thereof, a handle, and the wheels, of a rock-shaft supported by the body, a brake-arm arranged at each end of the rock-shaft and having one end secured to the latter and the other end arranged and adapted to be brought into engagement with the wheels, arms G² G³ having connection with the rock-shaft, a spring secured at one end to the arm G³ and at the opposite end to the body of the vehicle, an operating-lever arranged adjacent to the handle of the vehicle, and a connection between the lever and the arm G², all arranged for coöperation, as and for the purposes specified.

2. In a vehicle, the combination with the body thereof, a handle, and the wheels, of a rock-shaft supported by the body, a brake-arm arranged at each end of the rock-shaft and having one end secured to the latter and the other end arranged and adapted to be brought into engagement with the wheels, arms G² G³ having connection with the rock-shaft, a spring secured at one end to the arm G³ and at the opposite end to the body of the vehicle, an operating-lever arranged adjacent to the handle of the vehicle, and a connection between the lever and the arm G², an arm L' in connection with the rock-shaft and a spring secured at one end to the said arm and at the opposite end to a fixed part of the vehicle.

In testimony whereof I have hereunto set my hand in the presence of the two subscribing witnesses.

HARRY THOMSETT.

Witnesses:
ERNEST SPENCE,
E. N. LEWIS.